United States Patent [19]
Fussell, Jr.

[11] 3,823,610
[45] July 16, 1974

[54] BLUFF BODY FLOWMETER UTILIZING A MOVEABLE SHUTTER BALL RESPONSIVE TO VORTEX SHEDDING

[75] Inventor: Theodore John Fussell, Jr., Bridgewater Twsp., Somerset Cty., N.J.

[73] Assignee: Eastech, Inc., South Plainfield, N.J.

[22] Filed: Jan. 5, 1973

[21] Appl. No.: 321,532

[52] U.S. Cl. .............................................. 73/194 B
[51] Int. Cl. .......................... G01f 1/00, G01p 5/10
[58] Field of Search ............. 73/194 B; 235/201 ME

[56] References Cited
UNITED STATES PATENTS
3,564,915  2/1971  Tomota et al. ........................ 73/194
3,587,312  6/1971  McMurtrie et al. .................... 73/194
3,693,438  9/1972  Yamasaki et al. ..................... 73/194
3,722,273  3/1973  Yamasaki et al. ..................... 73/194

FOREIGN PATENTS OR APPLICATIONS
44-1905   1/1969   Japan .................................. 73/194

*Primary Examiner*—Herbert Goldstein

[57] ABSTRACT

A bluff body flowmeter is disclosed which includes a bluff body having a base surface facing fluid flow, a pair of converging downstream surfaces, a pair of orifices proximate the downstream surfaces, a cylindrically shaped chamber within the body in communication with the pair of orifices via separate channels, a shuttle ball free to move a relatively short distance within said chamber along the long axis of said bluff body in response to vortex induced pressure changes at the orifices, and means responsive to the movement of the ball for producing electric signals related to volumetric flowrate.

14 Claims, 3 Drawing Figures

(FLOW INTO PAPER)

BLUFF BODY FLOWMETER UTILIZING A MOVEABLE SHUTTER BALL RESPONSIVE TO VORTEX SHEDDING

BACKGROUND OF THE INVENTION

This invention relates to flowmetering equipment and, in particular, to an improved bluff body device with an integrated sensor capable of measuring flow rates accurately despite the presence of flow noise.

In U.S. Pat. No. 3,572,117 to A. E. Rodely, assigned to the assignee hereof, there is described a flowmeter which incorporates a bluff body for generating a predictable oscillating wake, or shedding vortices, in a fluid flowing through a pipeline. A temperature sensitive sensor situated outside of the wake generated by the bluff body detects the fluid motion and generates electrical pulses proportional to the flow rate. In that arrangement the sensor is mounted separately in the pipeline wall and the probe-like sensor is positioned in the low turbulence flow zone outside of the wake.

An improved version of the Rodely bluff body flowmeter, disclosed in U.S. Pat. No. 3,732,731 and also assigned to the assignee hereof, teaches an arrangement for detecting fluid motion in the high turbulence flow zone immediately downstream of the bluff body. In that arrangement, a temperature sensor is integrated with the bluff body which contains fluid channels in communication with the downstream flow.

In yet another integrated sensor arrangement taught in pending application Ser. No. 185,746 filed on Oct. 1, 1971 and assigned to the assignee hereof, a cylindrical body, containing a ferro-magnetic disc is situated in a channel within the bluff body. The channel is open to the high turbulence down-stream flow which moves the disc up and down in the channel in response to periodic pressure changes. As the disc moves, it interrupts a magnetic field causing perturbations which result in an EMF related to the flow-rate.

While the foregoing flowmetering arrangements represent significant contributions to the state of the art, the sensor elements which come into contact with the pipeline fluid are complex and costly to manufacture. This is particularly true of the version employing the encapsulated ferromagnetic disc to monitor pressure changes. Unless extraordinary and costly precautions are taken, in many instances, the corrosive effects of the pipeline fluid over an extended period will render the sensor element erratic or inoperative, and it must be replaced.

It is therefore an object of my invention to produce a sensor for the high turbulence flow zone responsive to pressure changes which employs a relatively inexpensive fluid contacting element and exhibits a longer, useful life than prior art devices.

In general, a significant problem in pressure sensing bluff body devices in the prior art is detection of low pressure differentials. If the forces acting on the moving sensor are substantial due either to the mass of the sensor, or friction, or the forces are not uniform through the full range of motion, such as in vertical movement, inaccurate readings will be obtained at low flow rates.

It is another object of my invention to produce a pressure sensing body usable in a high turbulence flow zone which has a greater sensitivity to fluid pressure changes than heretofore known and which faithfully responds to relatively low fluid pressure changes.

It is yet another object of this invention to provide a sensor arrangement in which moveable body travels relatively short distances in response to differing fluid pressures, exhibits a low friction contact within the restraining chamber and produces a relatively large electrical signal proportional to the flow rate.

SUMMARY OF THE INVENTION

These and other objects are accomplished in accordance with my invention which comprises a bluff body flowmeter including a bluff body having a base surface facing fluid flow, a pair of converging downstream surfaces, a pair of orifices proximate the downstream surfaces, a chamber in registry with the orifices containing means moveable along the long axis of the body in response to vortex induced pressure changes in the two orifices, and means responsive to the motion of the moveable means for producing an electrical signal related to volumetric flowrate.

In an illustrative embodiment, one orifice is located on each downstream surface and the two orifices communicate with each other through a first and a second channel each of which connects to one end of a cylindrically shaped chamber; the moveable means is a hollow nickel sphere of low inertia which is free to move from side to side along the long axis of the bluff body a distance equal approximately to one-tenth the diameter of the sphere; and a permanent magnet which generates a magnetic field in the region of the chamber.

In operation, the sphere travels a relatively short distance within the cylindrical chamber as the fluid pressure at the two orifices changes. The signal amplitude is enhanced by the fact that the chamber is close to the magnetic pickup and because the sphere oscillates directly away from and toward the pickup at a point of field line concentration. In addition, the short travel and close tolerance of the chamber prevent unwanted oscillations and undue wear of the shuttle. Another advantage of my invention is that the calibration factor of my flowmeter depends essentially on the dimensions of the bluff body and the pipeline rather than on the sensor itself.

The magnetic detector of the illustrative embodiment is advantageously inserted into the bluff body but is in a separate channel which does not communicate fluidwise with the chamber containing the sphere or shuttle. Accordingly, only the shuttle ball comes into contact with the fluid in the pipeline, or conduit, protecting the magnetic pickup and associated circuitry from any corrosive effects of the pipeline fluid. In addition, my arrangement is ideally suited to measurements in high static pressure systems because there are no surfaces requiring special sealing consideration outside the bluff body itself.

BRIEF DESCRIPTION OF THE DRAWING

The above and other objects of my invention, together with its various features and advantages, can be easily understood from the following more detailed discussion taken in conjunction with the accompanying drawings, in which.

DETAILED DESCRIPTION

Figure 1:
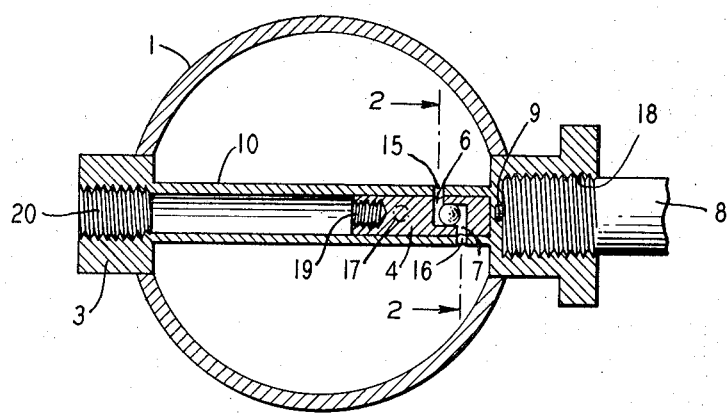
FIG. 1 is a cross-sectional view taken through the pipeline and bluff body exposing for inspection thereby the shuttle sensor within its chamber as well as the magnetic pickup device.

Turning now to FIG. 1, there is shown a cross-sectional view of my integrated sensor and bluff body 10 installed within pipeline 1. Bluff body 10 contains end support members 3 and 3' for supporting it within the conduit 1. Body 10 includes a cylindrical shaft extending through member 3 and running from left to right in the Figure and, within that shaft is a chamber body 4 shown in cross section. Bluff body 10 contains two downstream orifices 15 and 16 which are in registry with channels 6 and 7 of chamber body 4 to permit the fluid pressure changes in the high turbulence zone to influence the horizontal position of shuttle 5 within body 4. Bluff body 10 also incorporates a threaded channel 18 shown at the right side of the Figure in which a magnetic pickup device 8 has been installed. Device 8 produces a relatively strong magnetic field in the chamber body 4 and therefore surrounding shuttle ball 5. It is to be noted that channel 18 does not fluid-wise communicate with channels 15 and 16, thereby fluid in the pipeline does not contact device 8; and accordingly, the measurement of the flowrate is made without permitting the fluid to have a corrosive effect on the magnetic pickup, etc. The pipeline fluid contacts only shuttle ball 5 which is a simple hollow metal sphere in this illustration.

Before discussing in detail the manner in which bluff body 10 is adapted to measure volumetric flowrates, it should be recognized that bluff body 10 can have various other geometric configurations. These various shapes are given in the Rodely patent. The bluff body of my embodiment shown in FIG. 2 is selected only as illustrative of the many shapes possible; and as the ensuing discussion will reveal, my shuttle ball sensor can be adapted to any one of those variety of shapes without departing from the spirit of this invention.

Figure 2:
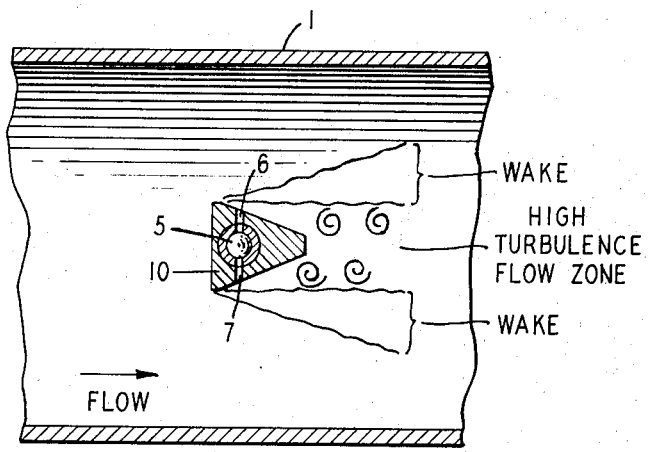
FIG. 2 is a cross-sectional view taken along section line 2-2 showing the positioning of the sensing orifices in the high turbulence flow zone generated by the bluff body.
Figure 3:
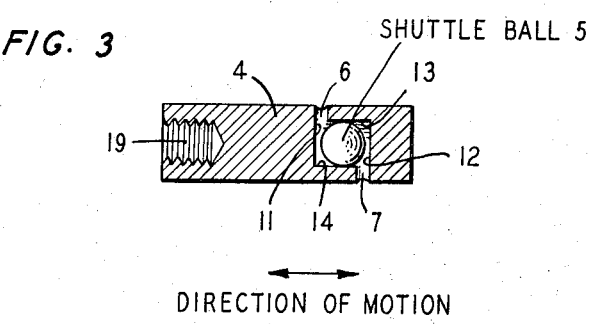
FIG. 3 is a cross-sectional view of the shuttle ball, shuttle ball chamber and sensing orifices.

Each of the foregoing bluff bodies such as shown in FIG. 2 produces vortex shedding which induces cyclic changes (e.g., in pressure, velocity). These changes which are proportional to the flowrate, are detected in accordance with my invention in the following manner. As shown in FIG. 3, shuttle ball 5 which is preferably a hollow nickel sphere is disposed in a cylindrical chamber having contiguous cylindrical side walls 13 and 14 as well as circular end walls 11 and 12. The movement of ball 5 is constrained to the cylindrical chamber which has a dimension between end walls 11 and 12 of approximately 1.1 times the diameter of ball 5. The chamber diameter (distance between walls 13 and 14) is sufficient to permit ball 5 to freely shuttle back and forth as shown in FIG. 3, but at the same time insufficient to permit any appreciable vertical movement. Vortex shedding (see FIG. 2) caused by bluff body 10 induces in channels 6 and 7 periodic pressure changes which cause ball 5 to move in the direction indicated in FIG. 3. The frequency of this motion is related to the volumetric flowrate. The horizontal motion of the ball is restricted in my arrangement because I have learned through experimentation that a larger chamber generates unwanted oscillations of the shuttle ball.

As previously mentioned, channel 18 contains a magnetic field generating device 8 which produces a field with a dense region of field lines near shuttle ball 5. The motion of ball 5 through these lines of magnetomotive force perturbs the field creating an EMF which is detected by head 9.

Advantageously, when it is desired to remove shuttle ball body 4 from bluff body 10 for replacement or realignment, threaded insert 20 shown at the left of FIG. 1 is unthreaded from assembly 10 and removed. This exposes threaded surface 19 which may be engaged by the appropriate tool. When so engaged the tool is withdrawn from bluff body 10 carrying with it body 4. If it is necessary to remove body 4 from the bluff body without affecting the pipeline seals, set screw 17 which aligns body 4 within assembly 10 can be replaced by a guiding groove (not shown) inside assembly 10 and a mating protrusion (not shown) on body 4.

It is to be understood that the above-described arrangements are merely illustrative of the many possible specific arrangements which can be devised to represent applications of the principles of my invention. Numerous and varied other arrangements can be devised in accordance with these principles by those skilled in the art without departing from the spirit and scope of my invention. More particularly, the moveable member can take on various geometries. Moreover, the detection apparatus could employ the moveable member to interrupt or reflect a light beam, sonic beam or microwave beam. Also, the moveable member could be used to inductively or capacitively tune/detune an electronic oscillator circuit.

Optionally, orifices 15 and 16 may be sealed with a flexible diaphragm and channels 6 and 7 filled with a fluid to prevent highly corrosive fluids from contacting shuttle ball 5.

What is claimed is:

1. Apparatus for measuring the flowrate of fluid in a conduit comprising a vortex shedding body including a base surface facing fluid flow and a pair of converging surfaces extending downstream from said base surface, and having a pair of orifices each of which is adjacent to one of said converging surfaces; said body having an inner cylindrical chamber elongated in a plane parallel to said base surface and converging surfaces, said chamber having end portions at opposite ends of said chamber, and a pair of relatively smaller channels each of which extends from an individual one of said end portions of said chamber to an individual one of said orifices for communication with fluid flow in said conduit; a spherical shaped member situated in said chamber and moveable in a direction transverse to said fluid flow and along an axis of said body substantially parallel to said base surface and said converging surfaces in response to vortex induced changes at each said orifice; and means in nonfluid communication with said fluid flow in said conduit and responsive to the movement in said chamber of said member away from and toward said means for producing an electrical signal related to said flowrate.

2. The apparatus of claim 1 wherein said spherical shaped member has a diameter $d$, and said chamber has restraining end walls separated a distance of substantially $1.1d$ for limiting horizontal movement.

3. The apparatus of claim 1 wherein said vortex shedding body includes a cylindrical shaft running parallel to the long axis of said body with an opening at an end of said body, and a chamber body adapted to be removably inserted into said shaft and said cylindrical chamber being housed within said chamber body.

4. The apparatus of claim 3 wherein said smaller channels comprise a first pair of channel elements each extending between said cylindrical shaft and an individual one of the converging surface orifices, and said chamber body contains a second pair of channel elements communicating with said cylindrical chamber and in registry with said first pair of channels.

5. The apparatus of claim 3 wherein said chamber body contains a tool engaging surface at an end thereof facing said opening suitable for accessing said chamber body to remove it from said shedding body.

6. The apparatus of claim 5 wherein said vortex shedding body includes at least one support member at an end thereof for mounting said vortex shedding body in said conduit, and said cylindrical shaft extends into said support member.

7. The apparatus of claim 6 wherein said vortex shedding body includes a second support member for mounting said body in said conduit, said first pair of channel elements are positioned relatively closer to said second support member than to said one support member, and said second support member incorporates a channel for receiving said signal producing means.

8. The apparatus of claim 7 wherein said signal producing means includes a magnetic field generating means insertable into said support member from outside said conduit, and a pickup head projecting into said support member along a horizontal axis of said shedding body common to an axis of said cylindrical shaft for detecting EMF's induced in said generated field by perturbations of said field by said spherical shaped member.

9. The apparatus of claim 1 wherein said spherical shaped member comprises a hollow nickel sphere.

10. Apparatus for measuring the flowrate of fluid in a pipeline comprising a bluff body having a base facing fluid flow effective to produce vortex shedding in said fluid, said surface extending along a diameter of said pipeline and between the walls thereof and having further a pair of planar converging surfaces extending downstream of said base surface forming a substantially triangular cross section of said bluff body, said bluff body having a cylindrical shaft parallel both to said base and said converging surfaces extending therethrough, said bluff body further having a first and second channel extending between respective ones of said converging surfaces and said cylindrical shaft, said first and second channels being offset from each other with respect to a longitudinal axis through said cylindrical shaft, a cylindrically shaped ball receiver having an outer diameter smaller than the inner diameter of said shaft suitable for insertion into said shaft, said bluff body having an opening to said shaft at one end only to receive said ball receiver, said receiver including a cylindrically shaped ball retaining chamber in which a spherical member is situated, said chamber being so positioned within said receiver and of proportions sufficient to allow movement of said member along said long axis, said receiver further including third and fourth channels extending from an outside surface thereof to opposite ends of said retaining chamber, and said third and fourth channels being offset from one another so to be in alignment with said first and second channels when said receiver is inserted into said shaft.

11. The invention set forth in claim 10 wherein said bluff body includes a mounting member at one end thereof for securing said body to said pipeline, a magnetic field generating device being installed within said member for establishing a magnetic field about said retaining chamber, said spherical member being adapted to movement along said chamber axis in response to vortex shedding at a rate proportional to the fluid flowrate, and pickup means integrated with said generating device for detecting perturbations in said field as a result of the movement of said spherical member.

12. The invention set forth in claim 10 wherein said receiver incorporates a tool engaging surface which is accessible through said opening in said shaft to facilitate removal of said receiver from within said shaft.

13. The invention set forth in claim 10 wherein the distance along said one axis of said chamber in the direction of movement of said spherical member is equal approximately to 1.1 times the diameter of said spherical member.

14. Apparatus for measurement of the flowrate of fluid in a pipeline comprising a bluff body having a base facing fluid flow effective to produce vortex shedding in said fluid, said body being in registry with the inner walls of said pipeline and having a longitudinal axis coincident with a diametric axis of said pipeline, said body further including a pair of planar converging surfaces extending downstream of said base surface thereby defining a substantially triangular cross section of said bluff body, said bluff body having a substantially cylindrical shaftway along said longitudinal axis with an opening at one end of said body, said body further having a first and a second channel extending between respective ones of said converging surfaces and said shaftway, the central axis of said first and second channels being respectively perpendicular to a central axis of said shaftway and being offset from each other with respect to said central axis a fixed distance, a ball receiver having a substantially cylindrically shaped outer surface and the diameter of said receiver is constant over its length and smaller than the inner diameter of said shaftway to permit insertion of said receiver therein, said receiver including a cylindrical ball retaining chamber having length $1.1m$, a diameter $m$ and a central longitudinal axis which is coincident with a central longitudinal axis of said retaining chamber, a spherical member having a diameter substantially equal to $m$ situated within said retaining chamber and free to move along the central longitudinal axis thereof, said receiver further including third and fourth channels extending from an outside surface thereof to opposite ends of said retaining chamber along the circumferential inner walls thereof, said third and fourth channels being offset from one another and in axial alignment with said first and second channels when said receiver is installed within said shaftway, said receiver further incorporating a tool engaging surface on said outer surface which is adapted to be accessible through said shaftway opening to facilitate removal of said receiver, said bluff body including a mounting member at an end thereof for fastening said body through an opening in said pipeline, a magnetic field generating device being installed within said mounting member for establishing a magnetic field about said receiver, and said spherical member being adapted when oscillating in response to vortex shedding to cause perturbations in said field.

* * * * *